Nov. 12, 1968    J. G. CARLSON    3,410,100
HIGH-VACUUM BAFFLE USING COOLED, CHEVRON-SHAPED MEMBERS
Filed March 18, 1965                        2 Sheets-Sheet 1

INVENTOR
John G. Carlson
BY
ATTORNEY

United States Patent Office 3,410,100
Patented Nov. 12, 1968

3,410,100
HIGH-VACUUM BAFFLE USING COOLED, CHEVRON-SHAPED MEMBERS
John G. Carlson, Boulder, Colo., assignor to the United States of America as represented by the Secretary of Commerce
Filed Mar. 18, 1965, Ser. No. 440,966
8 Claims. (Cl. 62—55.5)

ABSTRACT OF THE DISCLOSURE

This describes a high-vacuum baffle formed by a chevron-shaped solid member, at least one chevron-shaped annular member and a hollow body having a chevron-shaped inner surface. The various elements of the baffle are manufactured separately. The solid and annular members are then removably positioned in the hollow body by means of hollow elements to provide an optically dense path through the baffle. The hollow elements are interconnected in such a way that a coolant may be passed through the elements to cool the baffle.

This invention relates to a high-vacuum baffle and in particular to one using cooled, chevron-shaped members.

A high-vacuum baffle is essentially a mechanical obstruction that is often positioned in a vacuum system between the vacuum chamber and the diffusion pump. Since vapor molecules travel in essentially straight lines at the pressures attained in the system, the principles of ray optics are used in designing the baffle to provide an optically dense pumping path. The baffle permits the gas molecules in the chamber to pass through the path to the pump, but since the baffle is cooled, the pump-fluid vapors are condensed and the fluid is returned to the pump. Thus, the vapors are prevented from passing into the vacuum chamber where they might interfere with the operation being performed.

In one air-cooled baffle in the prior art, an array of linear, chevron elements are either welded or cast to a circular ring to form an optically dense pumping path. The linear elements, however, are difficult to position relative to the ring and do not conform well to the circular pattern of a diffusion pump throat, so that considerable loss in effective pumping orifice results at the side where the chevron elements point away from the curved edge of the ring. Further, the baffle cannot be easily cleaned when necessary.

Another air-cooled baffle is fabricated from a single piece of metal that is clamped to a rotary table on a vertical milling machine. The head of the milling machine is tilted to a desired angle and the slots are machined on one side. The work is then reversed on the alignment pins and the operations are carried out on the opposite side. The circular cuts are interrupted periodically to provide arms to support the baffle fins and to conduct heat to the cooling vanes. This design permits the circular slots to be concentric with the pump throat and takes full advantage of the undercut of the outer slot beyond the inner diameter of the pump throat, giving rise to an intrinsically more "open" baffle. However, the milling operations required make the baffle comparatively difficult to fabricate, and the baffle cannot be taken apart and cleaned.

Accordingly, it is an object of the present invention to provide a baffle that is fabricated with comparative ease and is easily taken apart to be cleaned.

Another object is to provide a baffle having chevron members that are supported and positioned by hollow elements. A coolant may be passed through the elements to cool the baffle.

This is accomplished, in one embodiment of the baffle, by forming a solid chevron-shaped member, at least one annular chevron-shaped member and a hollow body having a chevron-shaped inner surface. The dimensions of the solid and annular members and the inner surface of the body are such that the members may be positioned in the body by means of hollow elements to provide an optically dense path through the baffle. The hollow elements are interconnected in such a way that a coolant may be passed through the elements to cool the baffle.

In the figures, wherein like reference numerals designate like parts:

Figure 1:
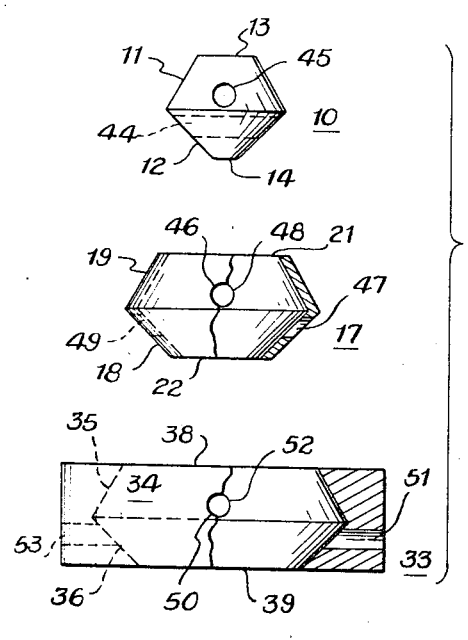
FIG. 1 is an exploded view of a solid member, a hollow member and a hollow body used in one embodiment of the present invention.

With reference to FIG. 1, the solid, chevron-shaped member 10 is composed of frustums of a right cone 11 and 12. The frustums are positioned so that the largest base of one coincides with the largest base of the other. The area of base 13 of frustum 11 is greater than the area of base 14 of frustum 12.

Figure 4:
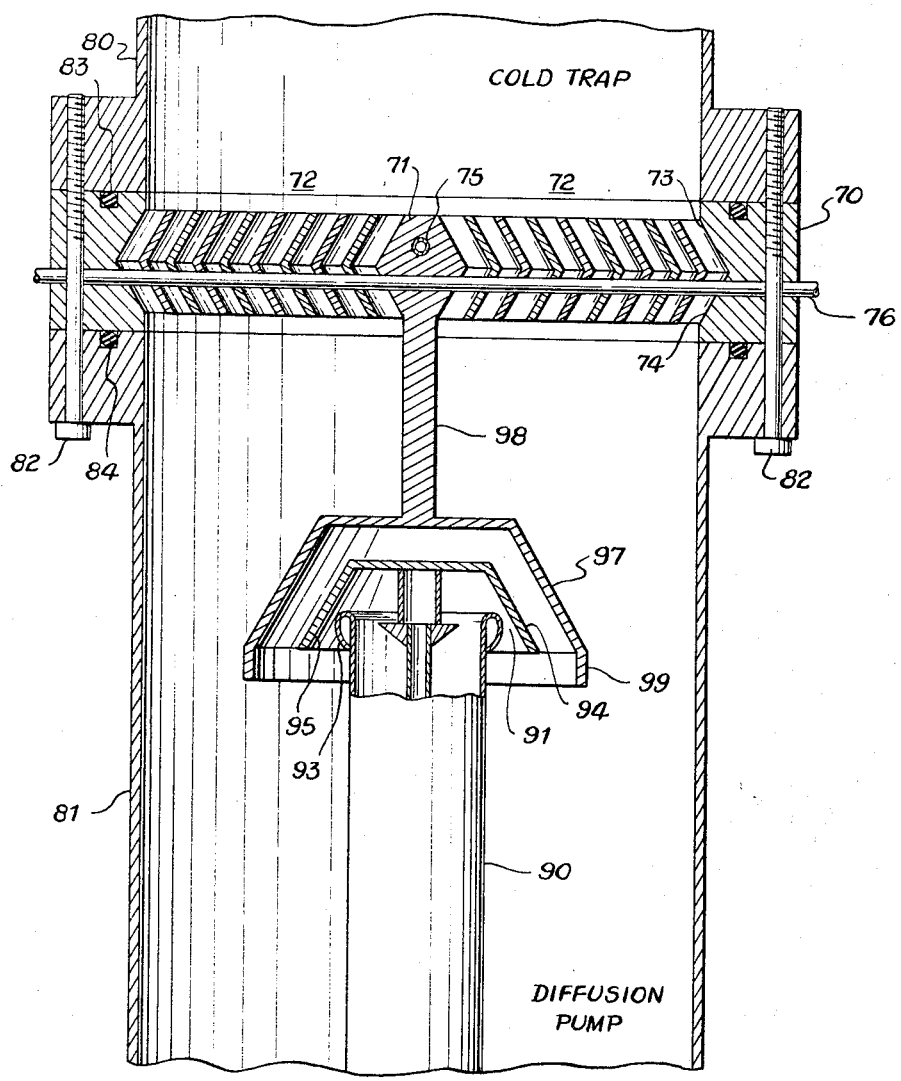
FIG. 4 represents a second embodiment of the present invention.

The annular, chevron-shaped member 17 comprises the hollow frustums of a right cone 18 and 19, that are positioned in such a manner that the largest circumference of one coincides with the largest circumference of the other. Member 17 encloses a hole whose cross-sectional area is larger at one end 21 than at the opposite end 22. It will be understood that more than one hollow member, such as 17, could be used if desired as shown in FIG. 4.

Body 33 has a chevron-shaped, inner surface 34 that is formed by the frustums of a right conic surface 35 and 36, placed in such a way that the largest circumference of one coincides with the largest circumference of the other. Surface 34 encloses a hole whose cross-sectional area 38 at one end is larger than the cross-sectional area 39 at the opposite end.

Holes 44 and 45 (FIG. 1) pass through solid member 10 in such a way that if the elements of the holes were in the same plane, the holes would be at right angles to each other. Hole 44 is positioned slightly below the largest diameter of member 10, and hole 45 slightly above the largest diameter. There are four holes, 46 to 49, positioned 90 degrees apart around annular member 17. Of the latter holes, 46 and 48 are located opposite each other and above the largest circumference of 17, while 47 and 48 are located opposite each other and below the largest circumference. In a similar manner four holes, 50 to 53, are positioned 90 degrees apart, around body 33 and pass through the inner surface 34. Two of these holes, 50 and 52, are placed opposite each other and above the largest circumference of surface 34; and two of the holes, 51 and 53, are placed opposite each other and just below the largest circumference of the surface. One hole 45 in member 10 is aligned with holes 46 and 48 in member 17 and holes 50 and 52 in body 33, while the other hole 44 in body 10 is aligned with holes 47 and 49 in member 17 and holes 51 and 53 in body 33.

Figure 2:
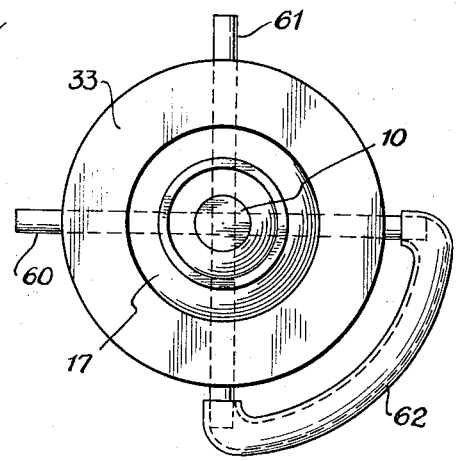
FIG. 2 is a top view and a cross section of the embodiment in FIG. 1.

As shown in FIG. 2, hollow member 17 is positioned in body 33 and solid member 10 is positioned in 17. Hollow element 60 is then inserted through holes 51, 47, 44, 49 and 53. Likewise, hollow element 61 is inserted through holes 50, 46, 45, 48 and 52. Thus, elements 60 and 61 support members 10 and 17 in body 33, and since the elements are disposed at "right angles" to each other, they precisely position the members in the body.

It will be apparent that 60 and 61 could be solid elements and that the elements are not required to be at "right angles" to each other to precisely position members 10 and 17 in body 33.

Hollow member 62 (FIG. 2) is connected between one end of element 60 and one end of element 61 to provide a path through which a coolant may be passed to cool the baffle. Hollow element 62 may be removed from elements 60 and 61, and the latter elements may be removed from members 10 and 17 and body 33 so that the baffle may be easily taken apart and cleaned.

Figure 3:
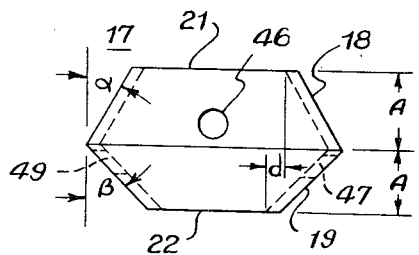
FIG. 3 is a view of the hollow member shown in FIG. 1.

The fabrication of members 10 and 17 and the inner surface of body 33 is illustrated by the fabrication of annular member 17 in FIG. 3. After cylindrical stock of suitable material, such as aluminum, is placed in a lathe, the inner and outer surfaces of 18 are cut at angle $\alpha$ and the inner and outer surfaces of 19 are cut at angle $\beta$, where the vertical line of each angle is perpendicular to the base of 18. Then, 18 and 19 are cut with the same amplitude A to form a pair of frustums of a right cone. The values of the amplitudes and angles $\alpha$ and $\beta$ are selected so that the hole enclosed by member 17 has a radius at 22 that is smaller by distance $d$ than the radius at 21.

In the embodiment of the baffle in FIG. 3, annular member 17 was cut to have walls that were 1/32″ thick, the altitudes A were 3/8″, $d$ was 0.100″ and the angles $\alpha$ and $\beta$ were 26° and 35°, respectively. The holes 46 to 49 were drilled 90° apart around member 17. Holes 46 and 48 were positioned opposite each other just above the largest diameter of the member 17, while holes 47 and 49 were positioned just below the largest diameter.

It will be apparent that the angles $\alpha$ and $\beta$ of frustums 18 and 19 could be made equal and the magnitudes of their altitudes could be made different, or that different values could be assigned to the angles and different altitudes could be used to obtain a hole in member 17 that has a diameter that is smaller at one end than at the other.

With reference to FIG. 4, baffle 70 comprises a solid, chevron-shaped member 71, annular, chevron-shaped members 72, and a body 73 that has a chevron-shaped inner surface 74. The construction of members 71, 72 and body 73 is similar to that of members 10, 17 and body 33, respectively, in FIG. 1. Members 71 and 72 are positioned in body 73 by means of hollow elements 75 and 76 in the same manner as the corresponding parts are positioned in body 33.

Baffle 70 is held in position between cold trap 80 and diffusion pump 81 by means of screws 82. The O-rings 83 and 84 are located in grooves in body 73 and in the body of pump 81, respectively, and seal the surfaces between the cold trap, baffle and pump.

The diffusion pump 81 has a hollow nozzle assembly 90 that includes several jet nozzles, one of which is indicated at 91. The nozzle 91 is formed by a lip 93 and a frusto-conical cap 94 which is spaced from the lip to leave an annular opening. The diffusion pump 81 and nozzle 91 are conventional and, as known in the art, hot oil vapors are driven upwardly through the assembly 90 and are expelled out of the spacing between lip 93 and skirt 95. The greater portion of these vapors are directed downwardly through the pump housing to achieve pumping action. However, a small amount of the vapor turns the lower edge of skirt 95 and migrates upwardly toward baffle 70.

To minimize the migration of oil vapor in the direction of baffle 70, a frusto-conical cap 97 is connected through rod 98 to solid member 71 and thus forms part of the baffle. Cap 97 is provided with a cylindrical skirt 99 that overlaps skirt 93, as shown in the figure. The former skirt deflects the vapors that turn outward and around the lower edge of skirt 95 and that would otherwise drift upward toward baffle 70. The deflected vapors impinge on the inner surfaces of 97 and 99, and most of the impinging vapors condense into droplets that fall into the heater of pump 81 to be vaporized.

While the embodiments described above, employ frustums of a right cone and circular conic surfaces, it will be understood that other surfaces, such as the frustums of a pyramid or ellipsoid, could be utilized if desired. Accordingly, various modifications are contemplated and may obviously be resorted to by those skilled in the art without departing from the spirit and scope of the invention, as hereinafter defined by the appended claims.

I claim:
1. A high-vacuum baffle including:
   a chevron-shaped solid member comprising a first and second frustrum positioned so that the largest base of one substantially coincides with the largest base of the other,
   a hollow body having a chevron-shaped inner surface formed by a first and second frustrum-shaped surface having their largest perimeters connected together,
   the cross-sectional area of the hole in the hollow body at one end being larger than at the opposite end,
   the outer surface of said solid member and the inner surface of said body being substantially geometrically similar,
   the altitudes of said first frustrum and said first surface being substantially equal, and the altitudes of the second frustrum and the second surface being substantially equal,
   the largest cross-sectional area of said solid member being smaller than the cross-sectional area of the hole at one end of the inner surface of said body and larger than the cross-sectional area of the hole at the other end of said inner surface, and
   means for positioning and supporting said solid member in said body in such a manner that an optically dense path is provided through the baffle.

2. The baffle set forth in claim 1 including:
   a cup-shaped member, and
   means for connecting said cup-shaped member to said solid member.

3. The baffle set forth in claim 1 wherein the positioning and supporting means comprises:
   a first and second hole passing through said solid member,
   a first and second hole and a third and fourth hole passing through said hollow body,
   a first element inserted through the first hole in said solid member and the first and second holes in said hollow body, and
   a second element inserted through the second hole in said solid member and the third and fourth holes in said hollow body.

4. The baffle set forth in claim 3 wherein:
   said first and second elements are hollow, and
   a hollow member positioned between one end of said first element and one end of said second element.

5. A high-vacuum baffle including:
   a chevron-shaped solid member comprising a first and second frustrum positioned so that the largest base of one substantially coincides with the largest base of the other,
   at least one chevron-shaped annular member formed by a first and second frustrum-shaped annular element having their largest perimeters connected together,
   the cross-sectional area of the hole in the annular member at one end being larger than at the opposite end,
   a hollow body having a chevron-shaped inner surface formed by a first and second frustrum-shaped surface having their largest perimeters connected together,
   the cross-sectional area of the hole in the hollow body at one end being larger than at the opposite end,
   the outer surface of said solid member and the outer and inner surfaces of said annular member and the inner surface of said hollow body being substantially geometrically similar, the largest cross-sectional area of said solid member being smaller than the cross-sectional area of the hole at one end of said annular member and larger than the cross-sectional area of the hole at the opposite end of said annular member, the largest cross-sectional area of said annular member being smaller than the cross-sectional area of the hole at one end of the inner surface of said hollow body and larger than the cross-sectional area of the hole at the other end of said last-mentioned surface, the altitudes of said first frustrum, first annular element and first frustrum-shaped surface being substantially equal, and the altitudes of said second frustrum, second annular element and second frustrum-shaped surface being substantially equal, and means for positioning and supporting said solid annular members in said hollow body in such a manner that an optically dense path is provided through the baffle.

6. The baffle set forth in claim 5 including:
a cup-shaped member, and
means for connecting said cup-shaped member to said solid member.

7. The baffle set forth in claim 5 wherein the positioning and supporting means comprises:
a first and second hole passing through said solid member,
a first and second hole and a third and fourth hole passing through said annular member,
a first and second hole and a third and fourth hole passing through said hollow body,
a first element inserted through the first hole in said solid member, the first and second holes in said annular member and the first and second holes in said hollow body, and
a second element inserted through the second hole in said solid member, the third and fourth holes in said annular member, and the third and fourth holes in said hollow body.

8. The baffle set forth in claim 7 wherein:
said first and second elements are hollow, and
a hollow member positioned between one end of said first element and one end of said second element.

References Cited

UNITED STATES PATENTS

| | | | |
|---|---|---|---|
| 2,291,054 | 7/1942 | Nelson | 230—101 |
| 2,703,673 | 3/1955 | Winkler | 230—101 |
| 3,075,689 | 1/1963 | Stevenson | 230—101 |
| 3,232,031 | 2/1966 | Simons | 55—269 X |
| 3,296,810 | 1/1967 | Hablanian | 55—269 X |
| 3,304,731 | 2/1967 | Bills et al. | 55—269 X |

OTHER REFERENCES

Colgate, "Circular Chevron Diffusion Pump Baffle," The Review of Scientific Instruments, vol. 34, No. 7, pp. 771–772, July 1963.

HARRY B. THORNTON, *Primary Examiner.*

D. E. TALBERT, JR., *Assistant Examiner.*